(12) United States Patent  
Zlotnick

(10) Patent No.: US 8,060,712 B2
(45) Date of Patent: *Nov. 15, 2011

(54) REMOTE MIRRORING BETWEEN A PRIMARY SITE AND A SECONDARY SITE

(75) Inventor: Aviad Zlotnick, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 773 days.

This patent is subject to a terminal disclaimer.

(21) Appl. No.: 11/735,209

(22) Filed: Apr. 13, 2007

(65) Prior Publication Data

US 2008/0256313 A1 Oct. 16, 2008

(51) Int. Cl.
*G06F 12/16* (2006.01)
(52) U.S. Cl. .................................. 711/162; 711/165
(58) Field of Classification Search .................. 711/162, 711/165
See application file for complete search history.

(56) References Cited

U.S. PATENT DOCUMENTS

| 2006/0010180 | A1 | 1/2006 | Kowamura et al. |
| 2006/0179343 | A1* | 8/2006 | Kitamura ........................ 714/6 |
| 2006/0236048 | A1 | 10/2006 | Deguchi et al. |

OTHER PUBLICATIONS

Camargos et al., "A Primary-Backup Protocol for In-Memory Database Replication," © 2006 IEEE, IEEE Computer Society, Fifth IEEE International Symposium on Network Computing and Applications (NCA '06), pp. 1-8.

* cited by examiner

*Primary Examiner* — Yong Choe
(74) *Attorney, Agent, or Firm* — Zilka-Kotab, PC

(57) ABSTRACT

In one embodiment, a method for remote mirroring includes providing a control entity coupled to a primary site and a secondary site, receiving first memory space information indicative of a location of a first memory space, establishing a remote mirroring relationship between the primary site and the secondary site, copying data from the primary site to the secondary site, and writing status information to the first memory space for storing status information representative of a relationship between data stored in the primary site and destined to be copied to the secondary site and data copied from the primary site to the secondary site.

14 Claims, 2 Drawing Sheets

REMOTE MIRRORING BETWEEN A PRIMARY SITE AND A SECONDARY SITE

FIELD OF THE INVENTION

The present invention relates to methods, systems and computer program products for remote mirroring.

BACKGROUND OF THE INVENTION

The importance of data has increased during the last decade while the cost of data storage medium has decreased, thus motivating data storage vendors to provide data protection schemes that are based upon duplication of data.

One of these protection schemes is known as remote mirroring. Remote mirroring involves repetitively generating one or more duplicates on a remote secondary site. Remote mirroring is mainly used for disaster recovery.

Remote mirroring does not guarantee that the secondary site is fully synchronized (consistent) with the primary (production) site at all times. A data set is consistent if it does not reflect any operation that depends on another operation that is not reflected in the data set.

In case of a disaster at the primary site, it is crucial to know whether the secondary site is fully synchronized and allows continuation of normal operation.

In cases where the primary and secondary site run compatible firmware, the primary site controller uses a special proprietary "update secondary" command to update the secondary site controller as to its status with respect to full synchronization.

In many cases the secondary site includes a secondary site controller that is not compatible with the primary site controller. This can occur due to cost constrains (for example—using a cheaper secondary site controller) but this is not necessarily so. In these situations the status of the secondary site can not be updated by sending a special proprietary "update secondary" command from the primary site controller to the secondary site controller.

There is a need to enable a control entity to know whether a secondary site is consistent even when the secondary site controller is not compliant with the primary site controller.

SUMMARY OF THE PRESENT INVENTION

In accordance with a first embodiment, a method for remote mirroring includes providing a control entity coupled to a primary site and a secondary site, receiving first memory space information indicative of a location of a first memory space, establishing a remote mirroring relationship between the primary site and the secondary site, copying data from the primary site to the secondary site, writing status information to the first memory space for storing status information representative of a relationship between data stored in the primary site and destined to be copied to the secondary site and data copied from the primary site to the secondary site.

In accordance with a second embodiment, a system for remote mirroring includes a control entity coupled to a primary site and a secondary site, a non-transitory computer readable medium having computer readable program code embodied therewith, the computer readable program code configured to receive first memory space information indicative of a location of a first memory space, the first memory space located at the secondary site, establish a remote mirroring relationship between the primary site and the secondary site, copy data from the primary site to the secondary site, and write status information to the first memory space for storing status information representative of a relationship between data stored in the primary site and destined to be copied to the secondary site and data copied from the primary site to the secondary site.

In accordance with a third embodiment, a system for remote mirroring includes a control entity coupled to at least a secondary site, a primary site coupled to the control entity, the primary site including a primary site controller and a primary storage controller, wherein the primary site is configured to establish a remote mirroring relationship between the primary site and the secondary site, copy data from the primary site to the secondary site, and receive first memory space information from the control entity and write status information to a first memory space at the secondary site, the first memory space information indicative of a location of the first memory space, the first memory space allocated for storing status information representative of a relationship between data stored in the primary site and destined to be copied to the secondary site and data copied from the primary site to the secondary site.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Methods, systems and computer program products for remote mirroring are provided.

Figure 1:
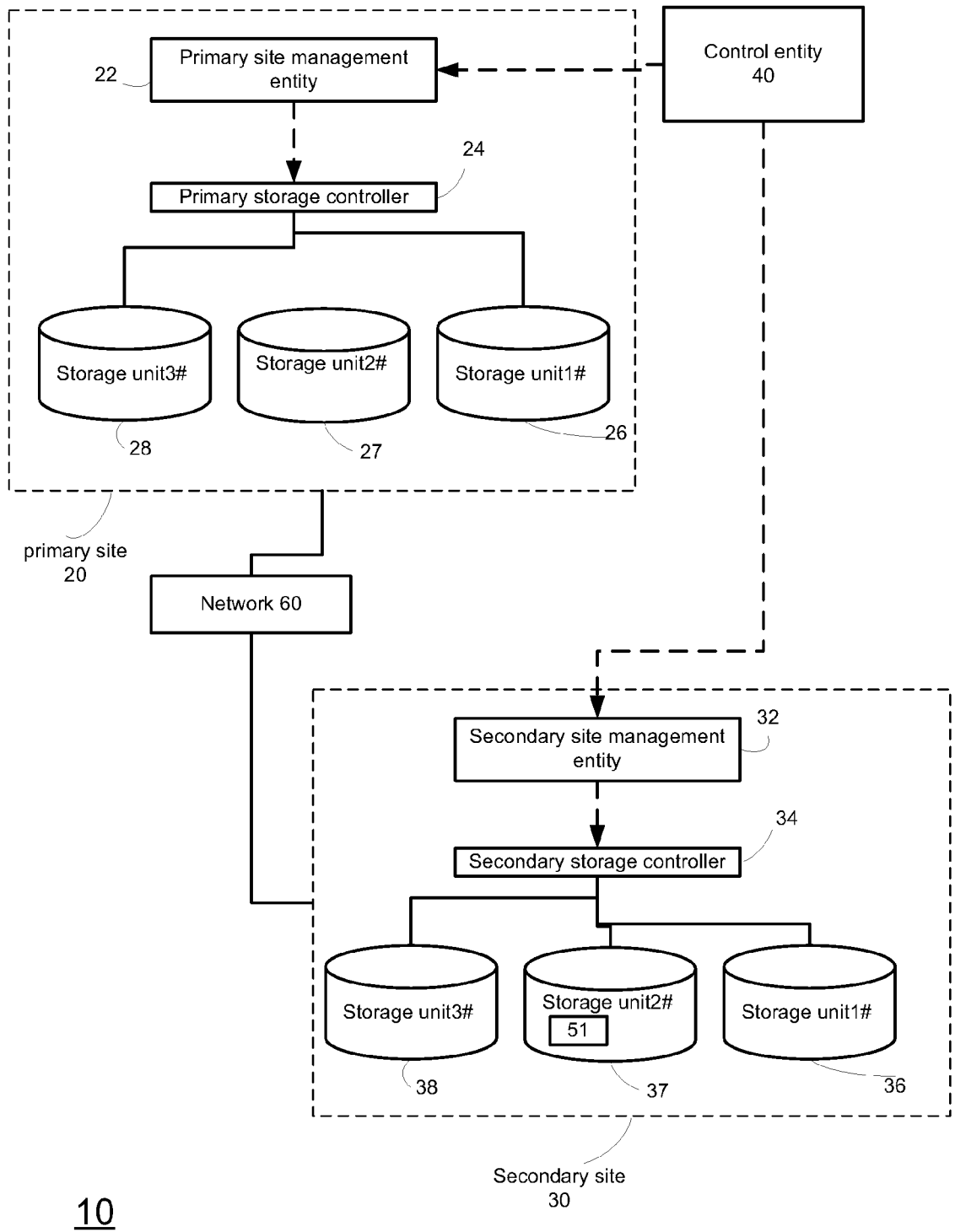
FIG. 1 illustrates a primary site environment, according to an embodiment of the invention.

FIG. 1 illustrates a primary site environment 10, according to an embodiment of the invention.

FIG. 1 illustrates a single primary and a single secondary site although the invention can be applied mutatis mutandis in environments that include multiple primary and secondary sites.

Environment 10 includes control entity 40, primary site 20 and secondary site 30. Primary site 20 and secondary site 30 can exchange data and status information over network 60.

It is further noted that each of the primary and secondary sites 20 and 30 can receive data from other components such as host computers (not shown), other storage sites and the like.

It is further noted that the various components within environment 10 can be connected to each other by various links, networks and the like. It is further noted that additional data protection schemes can be applied. These data protection schemes include using non-volatile memories, duplicating the primary site and at least one remote site and the like. Redundant power supply units as well as other components can also be used.

Primary site 20 includes three primary storage units 26-28, primary storage controller 24 and primary site management entity 22. Secondary site 30 includes three secondary storage units 36-38, secondary storage controller 34 and secondary site management entity 32.

Each primary storage site or secondary storage unit can include a disk, but this is not necessarily so. It is noted that the number of storage units per site can differ from three and that the number of primary storage units can differ from the number of secondary storage units.

Control entity 40 is connected to primary site 20 and secondary site 30. Control entity 40 is conveniently connected to primary site management entity 22 and to secondary site management entity 32.

Primary storage controller 24 is connected between primary site management entity 22 and between three primary storage units 26-28. Conveniently, primary storage controller 24 is controlled by primary site management entity 22. Primary storage controller 24 also controls three primary storage units 26-28.

Secondary storage controller 34 is connected between secondary site management entity 32 and between three secondary storage units 36-28. Conveniently, secondary storage controller 34 is controlled by secondary site management entity 32. Secondary storage controller 34 also controls three secondary storage units 36-38.

Control entity 40 can determine that a first memory space should be allocated at secondary site 30. The first memory space should be used for storing status information representative of (i) a relationship between data stored in the primary site but destined to be copied to the secondary site and (ii) data copied from the primary site to the secondary site. It is noted that the first memory space can include one or more memory sub-spaces that can be arranged in a continuous or a non-continuous manner.

Control entity 40 can instruct secondary site 30 to allocate the first memory space and can also instruct primary site 20 to write the status information to that first memory space whenever it is deemed necessary to write such information. It is noted that a single instruction can result in multiple write operations of the status information. For clarity of explanation first memory space is represented by box 51 within second secondary storage unit 37.

If control entity 40 (or primary site management entity 22) decides to start a mirroring relationship then primary site management entity 22 sends primary storage controller 24 an establish remote mirroring relationship command that includes first memory space information. The first memory space information is indicative of a location of the first memory space.

In response, primary storage controller 24 establishes a remote mirroring relationship with secondary site 30.

Once the remote mirroring relationship is established primary site 20 sends data (in a continuous or frequent manner) to secondary site 30 and writes status information to first memory space 51.

It is noted that control entity 40 can access the status information and in response be able to determine (i) the relationship between data stored in the primary site but destined to be copied to the secondary site and (ii) data copied from the primary site to the secondary site.

Conveniently, control entity 40 is adapted to determine whether secondary site 30 is consistent.

The determination (of the consistency) can be triggered by a failure of primary site 20 although this is not necessarily so.

The determination can be followed by determining (by control entity 40 or by another entity) how to recover from a failure of primary site 20.

Figure 2:
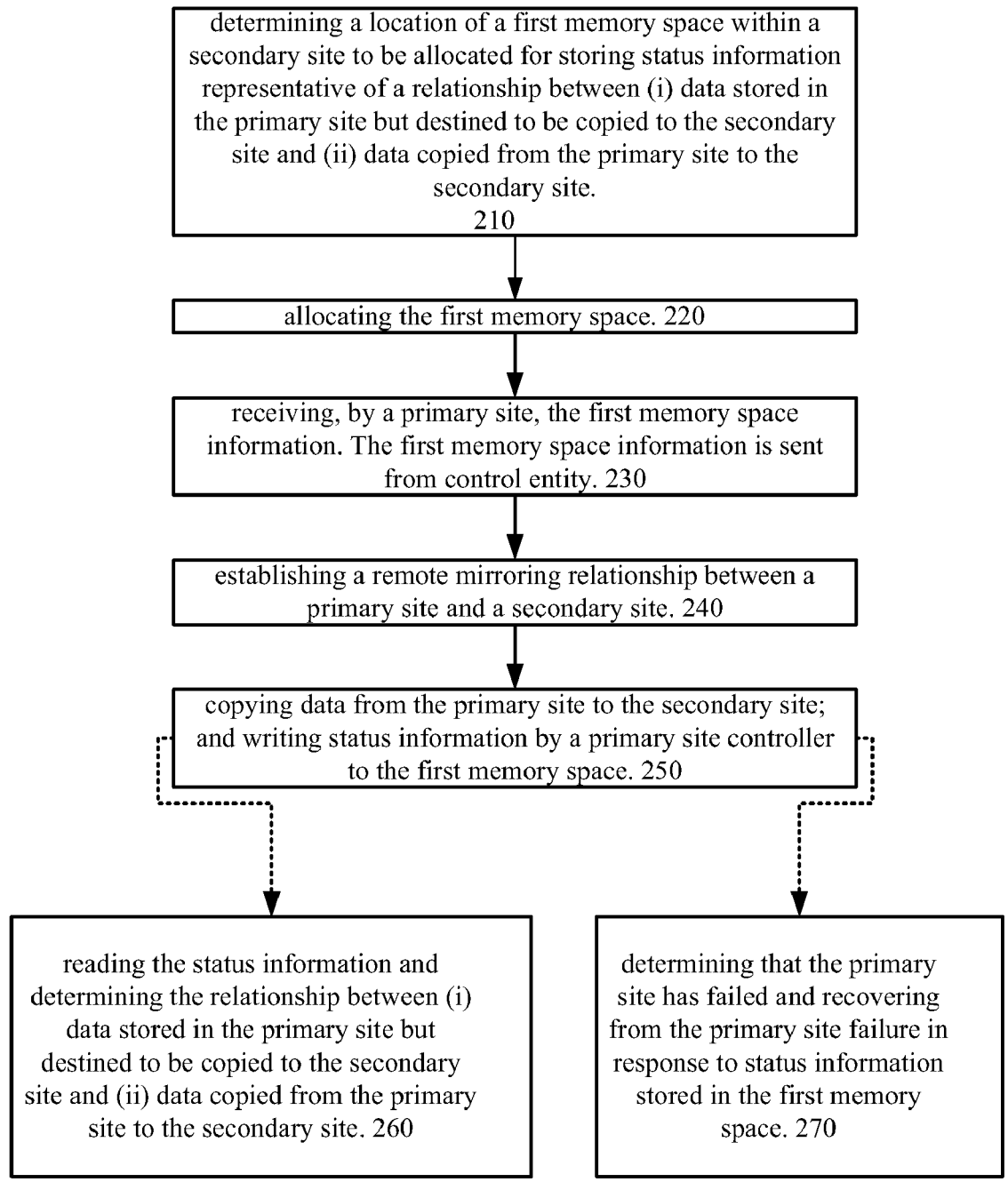
FIG. 2 illustrates a method for remote mirroring, according to an embodiment of the invention.

It is noted that primary site 20 can execute one or more stages of method 200 that is further illustrated in FIG. 2.

FIG. 2 illustrates method 200 for remote mirroring, according to an embodiment of the invention.

Method 200 starts by stage 210 of determining a location of a first memory space within a secondary site to be allocated for storing status information representative of a relationship between (i) data stored in the primary site but destined to be copied to the secondary site and (ii) data copied from the primary site to the secondary site.

The determination can be made by a control entity that does not belong to the primary site or to the secondary site.

Stage 210 is followed by stages 220 and 230. Stage 220 includes allocating the first memory space. Stage 220 can include sending an allocation instruction to the secondary site.

Stage 230 includes receiving, by a primary site, first memory space information. The first memory space information is indicative of a location of the first memory space. Conveniently, the first memory space information is sent from control entity.

Stages 220 and 230 are followed by stage 240 of establishing a remote mirroring relationship between a primary site and a secondary site.

Conveniently, stage 240 includes sending to the primary storage controller an Establish Remote Mirroring relationship command that includes the first memory space information.

Stage 240 is followed by stage 250 of copying data from the primary site to the secondary site and writing status information by a primary site controller to the first memory space.

Stage 250 can be followed by stages 260 or 270. Stage 260 includes reading the status information and determining the relationship between (i) data stored in the primary site but destined to be copied to the secondary site and (ii) data copied from the primary site to the secondary site. Stage 260 can include determining whether the secondary site is consistent. Method 200 can decide how to perform data recovery in response to the consistency of the secondary site.

Stage 270 includes determining that the primary site has failed and recovering from the primary site failure in response to status information stored in the first memory space. It is noted that stage 270 can include stage 260. If, for example, the secondary site is not consistent then the recovery process can include looking for another (consistent) secondary site, but this is not necessarily so.

It is further noted that stage 270 can include selecting between multiple secondary sites. It is noted that the determination (of said failure) can be responsive to a reception of a failure indication, as well as the absence of transmissions from the primary host. The determination can be made by the remote sites or by another component.

As will be appreciated by one skilled in the art, aspects of the invention may be embodied as a system, method or computer program product Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable storage medium(s) may be utilized. A computer readable storage medium may comprise any suitable non-transitory computer readable storage medium that includes, for example, an electronic, magnetic, optical, or semiconductor system, apparatus, or device, or any suitable combination of the foregoing. More specific examples (a non-exhaustive list) of the computer readable storage medium would include the following: an electrical connection having one or more wires, a hard disk, a semiconductor or solid-state memory, magnetic tape, a removable computer diskette, a random access memory (RAM), a read-only memory (ROM), a rigid magnetic disk, an erasable programmable read-only memory (EPROM or Flash memory), an optical fiber, a portable compact disc read-only memory (CD-ROM), and an optical disk, or any suitable combination of the foregoing. Current examples of optical disks include compact disk—read only memory (CD-ROB), compact disk—read/write (CD-R/W) and DVD. In the context of this document, a computer readable storage medium may be any tangible medium that can contain, or store a program for use by or in connection with an instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

I claim:

1. A method for remote mirroring comprising:
providing a control entity coupled to a primary site and a secondary site;
receiving first memory space information indicative of a location of a first memory space;
establishing a remote mirroring relationship between the primary site and the secondary site;
copying data from the primary site to the secondary site; and
writing status information to the first memory space for storing status information representative of a relationship between data stored in the primary site and destined to be copied to the secondary site and data copied from the primary site to the secondary site.

2. The method of claim 1 wherein the first memory space information is provided by the control entity and wherein the first memory space is located at the secondary site.

3. The method of claim 2 further comprising:
providing a primary site controller for sending an establish remote mirroring relationship command to the control entity, the remote mirroring relationship command comprising first memory space information.

4. The method of claim 1 further comprising:
reading the status information and determining the relationship between data stored in the primary site and destined to be copied to the secondary site and data copied from the primary site to the secondary site.

5. The method of claim 4 further comprising:
determining if the secondary site is consistent.

6. The method of claim 1 further comprising:
determining if the primary site has failed and if the primary site has failed, then recovering from the primary site failure in response to status information stored in the first memory space.

7. The method of claim 1 further comprising:
allocating the first memory space at the secondary site.

8. A system for remote mirroring comprising:
a control entity coupled to a primary site and a secondary site;
a non-transitory computer readable storage medium having computer readable program code embodied therewith, the computer readable program code comprising:
computer readable program code configured to receive first memory space information indicative of a location of a first memory space, the first memory space located at the secondary site;
computer readable program code configured to establish a remote mirroring relationship between the primary site and the secondary site;
computer readable program code configured to copy data from the primary site to the secondary site; and
computer readable program code configured to write status information to the first memory space for storing status information representative of a relationship between data stored in the primary site and destined to be copied to the secondary site and data copied from the primary site to the secondary site.

9. The system of claim 8 further comprising:
computer readable program code configured to send an establish remote mirroring relationship command to the control entity, the establish remote mirroring relationship command comprising first memory space information.

10. The system of claim 8 further comprising:
computer readable program code configured to read the status information and determine the relationship between data stored in the primary site and destined to be copied to the secondary site and data copied from the primary site to the secondary site.

11. The system of claim 10 further comprising:
computer readable program code configured to determine if the secondary site is consistent.

12. The system of claim 8 further comprising:
computer readable program code configured to determine if the primary site has failed and if the primary site has failed, then recover from the primary site failure in response to status information stored in the first memory space.

13. A system for remote mirroring comprising:
a control entity coupled to at least a secondary site;
a primary site coupled to the control entity, the primary site comprising:
a primary site controller and a primary storage controller, the primary site configured to establish a remote mirroring relationship between the primary site and the secondary site;
the primary site configured to copy data from the primary site to the secondary site; and
the primary site controller configured to receive first memory space information from the control entity and write status information to a first memory space at the secondary site, the first memory space information indicative of a location of the first memory space, the first memory space allocated for storing status information representative of a relationship between data stored in the primary site and destined to be copied to the secondary site and data copied from the primary site to the secondary site.

14. The system of claim 13 wherein the primary site controller is configured to send an establish remote mirroring relationship command comprising the first memory space information to the primary storage controller.

* * * * *